United States Patent
Faenger et al.

(10) Patent No.: US 8,492,638 B2
(45) Date of Patent: Jul. 23, 2013

(54) PERSONALIZED ENTERTAINMENT SYSTEM

(75) Inventors: Jens Faenger, Santa Clara, CA (US); Georg Fiechtner, Wackersberg (DE)

(73) Assignee: Robert Bosch GmbH, Stuttgart (DE)

( * ) Notice: Subject to any disclaimer, the term of this patent is extended or adjusted under 35 U.S.C. 154(b) by 531 days.

(21) Appl. No.: 12/536,214

(22) Filed: Aug. 5, 2009

(65) Prior Publication Data
US 2011/0035031 A1  Feb. 10, 2011

(51) Int. Cl.
*G10H 1/18* (2006.01)
(52) U.S. Cl.
USPC .................. 84/615; 455/154.1; 455/432.3
(58) Field of Classification Search
USPC .............. 84/615; 455/3.04, 151.1, 151.2, 455/154.1, 179.1, 184.1, 185.1, 186.1, 432.3
See application file for complete search history.

(56) References Cited

U.S. PATENT DOCUMENTS

| | | | |
|---|---|---|---|
| 6,438,579 B1* | 8/2002 | Hosken | 709/203 |
| 7,003,515 B1* | 2/2006 | Glaser et al. | 707/723 |
| 7,072,846 B1* | 7/2006 | Robinson | 705/7.32 |
| 7,251,452 B2* | 7/2007 | Stumphauzer, II | 455/3.06 |
| 7,346,320 B2* | 3/2008 | Chumbley et al. | 455/186.1 |
| 7,672,873 B2* | 3/2010 | Kindig et al. | 705/26.1 |
| 7,711,838 B1* | 5/2010 | Boulter et al. | 709/231 |
| 7,720,852 B2* | 5/2010 | Dunning | 707/750 |
| 7,840,691 B1* | 11/2010 | De Bonet et al. | 709/231 |
| 2003/0194977 A1* | 10/2003 | Videtich et al. | 455/186.1 |
| 2006/0206478 A1* | 9/2006 | Glaser et al. | 707/5 |
| 2006/0212442 A1* | 9/2006 | Conrad et al. | 707/5 |
| 2006/0212444 A1* | 9/2006 | Handman et al. | 707/5 |
| 2007/0112861 A1* | 5/2007 | Buczek et al. | 707/104.1 |
| 2007/0286169 A1* | 12/2007 | Roman | 370/352 |
| 2009/0023406 A1* | 1/2009 | Ellis et al. | 455/140 |
| 2010/0267331 A1* | 10/2010 | Ingrassia et al. | 455/3.04 |

FOREIGN PATENT DOCUMENTS

WO  2007/044389 A2  4/2007

OTHER PUBLICATIONS

Bergstra et al., Aggregate Features and ADABOOST for Music Classification; 2006 Kluwer Academic Publishers, accepted for publication 2007 in Machine Learning; 16 pages.
West and Lamere, Research Article: A Model-Based Approach to Constructing Music Similarity Functions; Hindawi Publishing Corporation; EURASIP Journal on Advances in Signal Processing; vol. 2007, Article ID 24602, 10 pages.
Bergstra, et al., University of Montreal, CA, USA; "Aggregate Features and ADABOOST for Music Classification"; 2006 Kluwer Academic Publishers, printed in the Netherlands; 16 pages.

* cited by examiner

*Primary Examiner* — Jeffrey Donels
(74) *Attorney, Agent, or Firm* — Taft Stettinius & Hollister LLP

(57) ABSTRACT

A method of operating an entertainment system includes computer-implemented steps including accessing a remote electronic collection of audio/video recordings. The collection is associated with a user of the entertainment system. The recordings in the collection are analyzed to thereby determine an audio/video preference profile of the user. Electronic audio/video options of the entertainment system that conform to the user's preference profile are selected and offered to the user.

18 Claims, 4 Drawing Sheets

PERSONALIZED ENTERTAINMENT SYSTEM

BACKGROUND OF THE INVENTION

1. Field of the Invention

The present invention relates to entertainment systems, and, more particularly, to entertainment systems that can be personalized to a user's preferences.

2. Description of the Related Art

Entertainment systems are known to include radios as well as playback devices such as compact disc (CD) players. Listening to music on the radio is a typical example of how using an entertainment system is highly dependent on personal preferences. People prefer to listen to radio stations that play the music they like. Similarly, they tune to stations that broadcast the news they are interested in. Tuning to a station can be seen as a very simple approach to personalizing a radio. A more advanced type of personalization would be to configure the station preset pushbuttons of a radio with a user's most favorite stations.

If more radio stations become available, the task of presetting or tuning to stations becomes increasingly complex. Nowadays, in addition to regular AM/FM stations, there are a great number of stations available on satellite radio, digital broadcast radio, and on the internet as IP radio streams. Finding the stations with interesting content demands more time and attention from the user since it is still a manual task that requires active input from the user.

A few attempts have been made to make it easier for the user to find music that he likes. Approaches such as www.Last.FM and Amazon.com use collaborative filtering technology that compares the relationship between different items such as songs based on user behavior. For example, persons that like to listen to artists such as Coldplay often also like to listen to similar pop music artists such as U2.

Another approach for identifying similar music is based on content matching technology, such as used by Pandora.com and Pandora's Music Genome Project. This approach is based on a set of song characteristics. Each song is rated based on those characteristics, either by an automated process or by trained human specialists. By comparing the characteristics of different songs, it is possible to find similar songs.

A third approach uses ratings and requires active feedback from the user by letting him specify how much he likes or dislikes a specific song. Based on the feedback, and in conjunction with additional information such as the song characteristics, it is possible to determine if there are similar songs that the user might like.

A range of portable audio and video players make use of one of the above-described recommendation technologies in order to offer personalized content to the user. In addition, more advanced systems such as those developed by the assignee of the present invention may allow the user not only to play favorite songs from one source (e.g., all songs stored on the internal device storage of a portable player) but also to include a range of audio and video sources in the selection process without the need for the user to deal with specific sources. This process may be referred to as content based navigation.

The state of the art music recommendation approaches require a base knowledge about the user and the music he likes. Otherwise, an entertainment system is unable to offer help to the user in choosing the right music. This learning and feedback period is a critical point for all known personalized entertainment systems. A system is unable to give the user useful recommendations right from the very first moment of usage because the system needs time to learn about the music preferences of the user. This process usually requires tracking of listening behaviors over a period of time, active user feedback or a combination of both.

What is neither disclosed nor suggested in the art is a personalized entertainment system that overcomes the problems and limitations described above. More particularly, what is neither disclosed nor suggested is a personalized entertainment system that is capable of learning user preferences in a short period of time, which may be upon startup of the entertainment system.

SUMMARY OF THE INVENTION

The present invention provides a novel method for learning and utilizing the entertainment preferences of a user. Thus, an entertainment system operated in accordance with the invention may play music and other content to the likings of a user. Unlike known systems, the present invention may not need to learn the user preferences over time by observing the listening preferences. Instead, the present invention may use an existing audio/video collection of the user to make assumptions about his likings. This information may be provided to the entertainment system, for example, by connecting external storage devices to the collection. Based on this collection, the system may offer functionality such as a "personalized" radio stations presets and tuning, as well as making decisions as to what music to play from which of the available sources.

The invention comprises, in one form thereof, a method of operating an entertainment system in computer-implemented steps including accessing an electronic collection of audio/video recordings external to the entertainment system. The collection is associated with a user of the entertainment system. The recordings in the collection are analyzed to thereby determine an audio/video preference profile of the user. Electronic audio/video options of the entertainment system that conform to the user's preference profile are selected and offered to the user.

The invention comprises, in another form thereof, a method of operating an entertainment system in computer-implemented steps including accessing a remote electronic collection of representations of pieces of music. The collection is selected by a user of the entertainment system. The representations are analyzed to thereby determine a music characteristic that is associated with more of the representations than any other music characteristic. Such music characteristics may include, among other things, a musical genre or musical artist. Electronic audio/video options of the entertainment system that are associated with the at least one of a musical genre and a musical artist are selected and offered to the user.

The invention comprises, in yet another form thereof, a method of operating an entertainment system in computer-implemented steps including accessing an electronic collection of audio recordings, the recordings in the collection having been chosen by a user of the entertainment system. The recordings in the collection are analyzed to thereby determine a type of music represented by the recordings. A station that broadcasts the type of music represented by the recordings, and/or a musical selection that is of the type of music represented by the recordings is identified. The musical selection is stored within the entertainment system or in a remote location. The station and/or the musical selection is offered to the user.

An advantage of the present invention is that the entertainment system may be informed of the user's preferences within a short period of time without having to monitor in real time the radio stations and music selections that the user listens to.

Another advantage is that the preferences of multiple users may be melded together to provide an audio selection that appeals to some degree to all of the users.

BRIEF DESCRIPTION OF THE DRAWINGS

The above mentioned and other features and objects of this invention, and the manner of attaining them, will become more apparent and the invention itself will be better understood by reference to the following description of embodiments of the invention taken in conjunction with the accompanying drawings, wherein.

Figure 1:
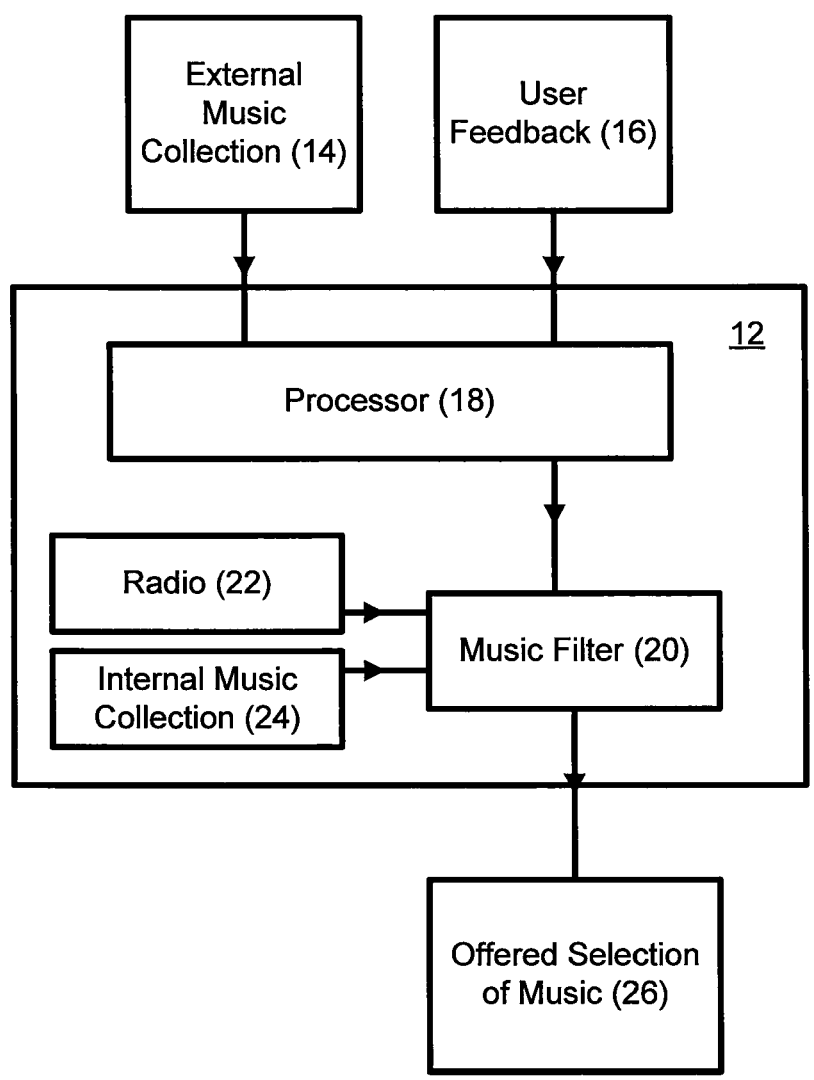
FIG. 1 is a block diagram of one embodiment of a personalized entertainment system arrangement of the present invention.

Corresponding reference characters indicate corresponding parts throughout the several views. Although the exemplification set out herein illustrates embodiments of the invention, in several forms, the embodiments disclosed below are not intended to be exhaustive or to be construed as limiting the scope of the invention to the precise forms disclosed.

DESCRIPTION OF THE PRESENT INVENTION

The present invention may provide a method for an entertainment system to learn about a user's musical taste. The invention takes advantage of the circumstance that users often carry with them, on their portable audio/video players, music in which they have an interest. Users may also store such songs that they like on their home personal computer or an internet server, which may also be accessible by a remote entertainment system. Users usually do not put music that they do not like on a device. But even if there do happen to be a few pieces of music that the user does not like on the player, the majority of the pieces of music stored on the player will still represent his preferences. Consequently, looking at a person's collection of stored music may make it possible to make a statement about that person's musical taste.

The present invention may use this knowledge about the user's musical preferences and apply it to stationary or mobile entertainment systems such as a car radio, a driver information system or a home stereo system. By sharing a user's music collection with such devices, the devices may be enabled to analyze the music and configure themselves to adapt to the music preferences of the user. According to one embodiment of the invention, a three step process may be used to enable such personalization: first, the audio/video collection may be accessed; second, the collection may be analyzed to make assumptions about the user preferences; and third, the entertainment system may be personalized.

The first step of the above-described personalization process may include introducing the user's preferred music to the entertainment system, e.g., accessing the audio/video collection. FIG. 1 is a block diagram of one embodiment of a personalized entertainment system arrangement 10 including an entertainment system 12 that may be communicatively coupled to a user's external music collection 14. Collection 14 may include digital reproductions of audible performances of songs or other pieces of music. System 12 may be at least partially or completely disposed within a vehicle, such as an automobile. However, system 12 may also be disposed in a non-mobile environment, such as a personal residence. System 12 may also actively or passively receive user feedback 16 regarding the user's musical likes and/or dislikes. In the particular illustrated embodiment, information about the contents of collection 14 as well as user feedback 16 are received by an electronic processor 18 of system 12.

Processor 18 may access and analyze the digital music that is included collection 14 in order to determine what type(s) of music is in collection 14, or in what genre(s) the music falls into. Alternatively, collection 14 may include, in addition to reproductions of the music itself, identifying textual information or other representations about the artist(s) and/or type of music that is in collection 14. In one embodiment, processor 18 may access such identification information in order to determine the musical preference profile of the user without having to analyze the content of the music in collection 14.

Processor 18 may run one or more algorithms for creating a music filter 20 based on information gathered from collection 14 and/or from feedback 16. For example, processor 18 may make assumptions or a determination as to the musical preferences of a user who owns collection 14 or who provides feedback 16. Processor 18 may then create music filter 20 to reflect the user's musical preferences in filtering potential music selections from radio 22 and/or internal music collection 24. Collection 24 may be stored on a hard drive or other memory device of system 12. Alternatively, collection 24 may be stored outside system 12 on a remote server or other external memory. In one embodiment, processor 18 may determine that collection 14 includes an unusually high percentage of songs by a particular artist, such as the Beatles. In addition, or in the alternative, processor 18 may determine that the user has historically given high ratings, or otherwise positive feedback, in response to songs by the Beatles. Thus, processor 18 may provide that filter 20 allows all music by the Beatles from radio 22 and/or collection 24 to be included in a selection of music 26 that is offered to the user.

It is also possible for processor 18 to determine from an analysis of collection 14 and/or feedback 16 which is the user's favorite genre of music, second favorite, etc. Processor 18 may then provide that filter 20 selects stations from radio 22 and/or songs from radio 22 and collection 24 that match the user's favorites genres of music. The selected stations and/or songs may then be included in the offered selection of music 26. The percentage of stations/songs of each favorite musical genre included in selection 26 may match the percentage representation of such genres in collection 14. For example, if collection 14 includes two-thirds country songs and one-third rap songs, then four of six preset pushbuttons of radio 22 may be programmed to country stations, and the other two preset pushbuttons may be programmed to rap stations. As another example, if collection 14 includes two-thirds country songs and one-third rap songs, then two-thirds of the songs extracted from collection 24 for inclusion in selection 26 may be country songs, and the other one-third may be rap songs.

Sharing the music collection with the entertainment system can be performed according to various methods. A first of such methods may include inserting a CD/DVD with audio or video content into the entertainment system. A second method may include physically connecting a storage device to the entertainment system such as a USB stick, flash memory card, MP3 audio player or portable audio/video player. A third method may include connecting the entertainment system to a built-in storage device, such as a hard drive or flash memory, and thereby using the content of such built-in storage device. A fourth method may include using a short range data connection technology such as Bluetooth to connect the entertainment system with storage devices containing the user's preferred content. A fifth method may include using a wired or wireless data connection between the entertainment system and a remote music repository on the internet. This method may allow the user to include and analyze large music collections stored on internet servers without the need to put the music collections on a local physical storage device.

By accessing the remote audio/video collection, the collection's content may be analyzed and the type of music present in the collection may be determined. It is also possible within the scope of the invention for the entertainment system to use the same music collection later on for playback purposes.

The second step of the above-described personalization process may include analyzing the collection in order to make assumptions or determinations about the user's musical preferences. The inventive entertainment system may scan through the audio/video collection on the storage device or in the repository on the internet and look at all the available audio and video files. In addition to audio and video files, the entertainment system may also make use of playlists, which represent a sequence of songs or other entertainment content, in order to learn about the type of music and video content the user is interested in. The entertainment system may use attached meta-information such as ID3 tags of mp3 files. The entertainment system may recreate missing meta-information by using databases such as Gracenote CDDB (www.gracenote.com), Free DB (www.freedb.org), or web services on the internet The entertainment system may also use music classification technologies such as described in "Aggregate Features and AdaBoost for Music Classification" by Bergstra, Machine Learning, Vol. 65, No. 2-3, pp. 473-484, 2006, and "A model-based approach to constructing music similarity functions" by West, EURASIP Journal on Advances in Signal Process, 2007, each of which are hereby incorporated herein by reference in their entireties. The entertainment system may also use music classification technologies to generate a set of characteristics for each song or other item.

In one embodiment, the results of the analysis may include a detailed breakdown of all the song characteristics and their distribution within the collection. Using statistical approaches, the inventive system may determine a set of characteristics that best describes the content (e.g., music) the user listens to, i.e., the user's musical preferences. Thus, the inventive system may determine what type of music and other content such as news, podcasts, etc. the user listens to often, and what type the user listens to only rarely or not at all.

After the analysis process has finished, the audio/video collection may no longer be required for the personalization of the entertainment system. Consequently, the storage device or the remote audio/video repository can be unplugged, disconnected from the entertainment system, or used as a source of playback content.

The third step of the above-described personalization process may include personalizing the entertainment system. Once the user preferences have been determined, the inventive system may adapt itself to the user's taste and offer functionality including: recommending radio stations (e.g., tuning frequencies) for pushbutton presets; "personalized" tuning to radio stations; radio auto-tune; and selecting songs/creating playlists.

Recommending radio stations for pushbutton presets may involve the entertainment system using the detected music preferences to offer a "personalized" set of radio frequencies to program into the pushbutton presets. An automatic preset assignment algorithm may assign or program frequencies of stations with sufficient signal strength onto the pushbutton presets of a radio until all the available pushbuttons are programmed or a station list is filled. According to the prior art, because the user might not be interested in all of the preset stations, he may have to manually change the pushbutton setup or the list entries. In contrast, the personalized station pushbutton preset programming algorithm provided by the inventive system may program the preset pushbuttons with only stations that closely match the musical preferences of the user. During the preset phase, each radio station that is in range of the entertainment system, such as stations on AM/FM, digital radio or internet radio, may be analyzed. The technologies used may be similar to the technologies for characterizing songs in the music collection during the analyzing phase. In addition, local and remote databases on the internet as well as technologies such as RDS (radio data system) may be used to determine the type of music played by a radio station (e.g., jazz, classical, soft rock, etc.). After radio stations have been analyzed, the similarities between the user's musical taste and the available radio stations are determined by the system. The system may use that information to sort stations by similarity to the user's musical taste and may place the most similar stations on the pushbutton presets or on a station list. In addition, further sorting criteria such as station signal strength may be included in the sorting process.

According to the prior art, in order to find a station for listening to, the user presses the tune forward/backward pushbutton to find a station with a sufficiently high signal strength. After the radio has tuned to a new station, the user may listen to the station for a short period of time to decide whether he likes the station or whether to tune to the next station. Similarly to the "personalized" pushbutton preset, the inventive system may provide "personalized" tuning. The functionality of automatically tuning to stations (with a single radio tuner) may involve the user pressing the forward/backward pushbutton in this tuning mode, and only stations that have a minimum level of similarity to the user's taste are presented to the user for his approval. All other stations may either not be presented to the user or may be filtered in other appropriate ways, thereby reducing the burden of the user having to listen and pick through a lot of stations that the user does not want to listen to.

State of the art radios may include two or more radio tuners. The functionality of automatically tuning to stations (with multiple radio tuners) may involve one of the tuners playing, e.g., being tuned to, the currently selected radio station while the other tuner scans for available radio stations and updates a list of available stations. Similarly, a radio including internet streaming capability may check for available stations and place the available stations in the list. If the user wants to switch to another station, he can select the station from that list by, for example, using a menu, forward/backward pushbuttons, etc. According to the invention, this multi-tuner scenario may be extended and enhanced with personalization techniques. The list of available stations may be filtered and sorted according to the user's musical preferences. In one embodiment, only stations that have a minimum level of similarity to the user's musical taste are offered as selection options. All other stations that do not have the minimum level of similarity to the user's musical taste may not be presented to the user or may be filtered in other appropriate ways.

According to the radio auto-tune functionality, if a currently-listened-to station can no longer be adequately received, e.g., because the strength of the received signal is too low, the system may offer to automatically tune to the next radio station that the system determines the user might be interested in. The "next" radio station may be a qualifying station that is closest in frequency to the current radio station, or may be a qualifying station that has the next higher frequency. The automatic tuning may be performed by use of the personalized tuning techniques for single tuner or multiple tuner radios described above. Moreover, if the system detects a new or other radio station that the system determines might be of greater interest to the user than the currently-listened-to station, then the system may inform the user about the station of greater interest and may offer the user a way to switch to that station of greater interest.

According to the selection of songs/creating playlists functionality, since the inventive system has learned about the musical taste of the user, the system may apply this knowledge in selecting songs or creating play lists from music stored on a local storage device or from other above-mentioned sources of music. The music collection from which songs are selected and/or a play list is created need not be the same music collection that was used to learn the user's music preferences. The inventive system may select from the music source(s) individual songs or a sequence or group of songs that match or correspond to the musical taste of the user.

The above-described functions may operate to personalize the entertainment system to the specific musical listening interests of the user. While music is one specific example of an application of the personalization method of the invention, the invention may also be applied to other forms of audio/video entertainment such as news, podcasts or movies.

The invention may encompass other beneficial extensions of the above-described embodiments. For example, as an alternative, or in addition, to using a user's music collection as an indicator of the user's music preferences, the system can use the radio station pushbutton settings (i.e., the stations to which the user programmed the pushbuttons) in the entertainment system for the same purpose. By configuring the radio pushbuttons with certain stations or adding certain stations to a list of favorites, the user expresses or indicates an interest in the particular kind of music played by those stations. Analyzing the stations to which the pushbuttons are programmed, or analyzing the content of the list of favorite stations, may make it possible to adapt the entertainment system to the musical preferences of the user even in cases where the entertainment system cannot access a music collection of the user. Reasons for the system's inability to access the user's music collection may include the system lacking the functionality to do so or the user not making his collection accessible, such as by failing to bring his collection into a vehicle that includes the entertainment system.

As another alternative, or in addition, to using a user's music collection as an indicator of the user's music preferences, the inventive system may provide means that enables the user to give active feedback about how much he likes or dislikes the currently played radio station or other music source. For example, the system may display various numeric values above or otherwise adjacent to respective pushbuttons. The user may then be prompted to assign a numeric rating to the currently listened-to music by pressing one of the pushbuttons. The inventive system may use such user-provided feedback information to adapt or modify the previously-learned user's musical preference profile accordingly.

As yet another alternative, or in addition, to using a user's music collection as an indicator of the user's music preferences, the inventive system may gather other forms of passive feedback from the user regarding his musical tastes. In one embodiment, the system records the aggregate lengths of time that the user listens to each station, and makes an assumption that the user's interest in that radio station, or in the musical genre of the radio station, is commensurate with, or indicated by, the length of time he has listened to the station. It is also possible to quantify the loudness or volume at which the user listens to each station, and to make an assumption that the user's interest in that radio station, or in the musical genre of the radio station, is commensurate with, or indicated by, such loudness or volume. The inventive system may use such passive feedback information to adapt or modify the previously-learned user's musical preference profile accordingly.

After analyzing the user's music collection, the inventive system may build a database that describes the musical preferences of the user, i.e., the user's musical preference profile. If, at a later time, another storage medium with a new and different music collection is connected to the system, the system may offer a range of options to the user. For example, the system may offer to "forget" the former music profile of the user and adapt to the new music profile as represented by the new music collection. In effect, the system may learn a new musical taste. Thus, it may be possible to easily switch between the different music preferences of different users just by connecting storage devices with the different music collections of the users.

Another option that the system may offer to the user when a new music collection is connected to the system is "integrating" the music preferences described by the new collection with the preexisting music preferences. This approach may make it possible to learn the music preferences described by a music collection that does not fit entirely on one storage device. This approach may also make it possible to integrate a range of different sources that all provide parts of the music collection. In addition, this approach may make it possible to determine an optimal blend reflecting the different music tastes of a group of users. For example, a blend of music may be chosen to best suit the various musical tastes of a group of persons who are riding in the same vehicle.

In a particular application, the present invention may be employed within a rental car. A user from out of town who rents the car may desire to listen to some local music on the radio, but may not know what station plays the type of music he likes, i.e., rock music. The rental car may be equipped with a personalized radio of the invention. The user may plug his iPod or other personal music player into the USB connector of the car radio. The inventive system may scan the music on the user's iPod and may ascertain that he has a lot of rock and some pop music on his mp3 player. The system may decide that the user is interested in mostly rock and some pop and may offer to find stations for him that play those types of music. By actuating a pushbutton, the user may accept the offer to find stations of his liking. The radio may then begin to scan through all the radio stations within the range of reception (e.g., all stations having a sufficiently strong received signal). For each scanned station, the system may analyze the type of music that is currently playing and/or may read an identification of the type of music that the station plays, wherein the identification is in embedded in the station's signal. After the scan is done, the personalized radio may program the six or so available preset pushbuttons with frequencies of stations that have been identified as playing rock and/or pop music. Radio stations that play other types of music may be left out of the preset pushbutton programming.

In addition, the inventive radio system may automatically tune to the one station that is currently playing a song that best matches the user's musical tastes as indicated by his music collection.

In another particular application, the present invention may be employed within a user's personal car. Assume that the user is driving the vehicle between cities and there are only a few radio stations available within reception range of the vehicle's location. Further assume that the user has with her a CD of songs by her favorite artist. After the user inserts that CD into her driver entertainment/information system, she asks the system to learn her music preferences by analyzing the CD. The user may make her request via a voice command or by pressing a particular pushbutton or sequence of pushbuttons, for example. Assume that the user likes the classical music on that CD a lot, but no stations that play classical music are within reception range of the vehicle. In response to her request, the system may inform her that no station that suits her taste, e.g., that plays classical music, is available. Further assume that, consequently, the user listens to an available pop music station instead of her preferred classical musical station. Later, as the vehicle gets closer to the destination city, a few new radio stations may gradually become within reception range. In one embodiment, the driver entertainment/information system may be equipped with two radio tuners. One of the tuners may be constantly scanning for new radio stations and an associated processor may be constantly analyzing the music that those scanned stations are playing. The processor may detect that one of the scanned stations is playing classical music and may then decide that the user might be interested in that station because the music it plays suits her musical taste. The system may then inform the user about the newly-identified classical station and may offer to tune to the radio to the station. The offer may be made via an audible message, a text message on a display of the system, or via a dedicated indicator light, for example. The user may accept the offer via a voice command or by pressing a particular pushbutton or sequence of pushbuttons, for example.

In another particular application, the present invention may be employed within a user's personal car. Assume that User 1 and User 2 are going on a road trip together in User 1's car, which has a personalized infotainment system of the invention with a built-in hard drive. Further assume that User 1 has stored a lot of his favorite music on the hard drive, and that most of the music is in the form of songs of the alternative rock type. User 1 may have earlier transferred the music from his music collection on his web server at home to the hard drive via a built-in wireless internet connection. Thus, the system may already know about User 1's music preferences. However, User 2 may not like alternative rock music, and may prefer instead music and pop songs produced in the 1980s, for example. Further assume that User 2 has her personal portable mp3 player with her, and the mp3 player has a big collection of songs that she selected on it. User 1 may plug User 2's portable player into the vehicle's information/entertainment system. The vehicle's information/entertainment system may detect the new music collection, and then ask the user(s) whether it should forget about, or at least temporarily disregard, User 1's music preferences, or consider both User 1's music preferences and the preferences indicated by the new music collection. User 1 may choose the last of these options, i.e., that the system should modify the music preference profile to reflect User 1's preferences as well as the newly-accessible music collection. User 1 may then switch to a "personalized music player" function of the system and select "play". Since the system now knows of the musical preferences of both User 1 and User 2, the system attempts to find songs that fit the tastes of both User 1 and User 2. Since User 1 does not have 80s music on the hard drive of the system, he may leave User 2's portable player connected to the information/entertainment system. Thus, the system may function as a personalized music player and may automatically make use of the music on the hard drive as well as the music on the portable player.

The present invention may include several novel features, including a device such as an entertainment system, radio, stereo system, music player, video player, etc. that uses an audio/video collection to learn about a user's entertainment preferences and that stores the preferences in a user profile. The collection can be directly connected to the device, stored inside the device, or stored outside of the device.

Another novel feature of the invention may be that music on audio CDs and the current settings of the radio pushbuttons are used to learn about the entertainment preferences of the user. For example, the songs on the CDs and the songs played on the radio may be classified as being of a certain type, and it may be assumed that the user would like to hear more music of that certain type in the future.

Yet another novel feature of the invention may be that the entertainment system uses the information gathered from the audio/video collection to change its functionality towards content that the user might be interest in. For example, the system may automatically tune in radio stations that play music of the type that the user likes. Alternatively, the system may select songs from a stored music collection that are of the type that the user likes.

Still another novel feature of the invention may be that the entertainment system is able to take into account the musical preferences of the user without the user having to manually train the entertainment system about his specific preferences (radio stations, preferred music, etc.). That is, the system automatically, or at least substantially automatically, learns the musical preferences of the user.

A further novel feature of the invention may be that it enables the information/entertainment system to quickly switch between user preferences by accessing different audio/video collections. For example, two or more users may each make their collection of preferred music accessible to the system. The system may switch between the preferences of the various users by accessing and playing selections from the users' respective music collections.

Another novel feature of the invention is that radio stations, or radio content sources, may be recommended to the user by the system based on the entertainment preferences the system determines to be indicated by the user's music collection. This feature may apply to all types of radio, including AM/FM, satellite radio, digital broadcast radio, internet radio streaming, etc.

Yet another novel feature of the invention may be the automatic programming of radio station preset pushbuttons on the radio according to a level of similarity of the music broadcast by the radio station to the user's audio/video collection. The programming may be based on the similarity of the currently-broadcast song, the type of music the station broadcasts as indicated by information carried on its broadcast signal, or a determination made by the system of the type of music the station broadcasts, such as by analyzing one or more samples of music broadcast by the station.

Still another novel feature of the invention may be "personalized radio tuning." For example, radio stations whose music does not match the user profile may be skipped in the tuning process. Likewise, available stations may be filtered by similarity with the user's profile to produce a list of recommended stations that do suit the user's musical tastes.

A further novel feature of the invention may be that the user's entertainment preferences learned by the system from his accessible audio/video collection may be used for selecting content from any of the entertainment sources that are available to the system. Such entertainment sources may include radio, CD player, hard drive, internet radio, satellite radio, etc.

Still another novel feature of the invention may be that the ability to integrate multiple audio/video collections from the same and different sources into a combined user profile. Further, these audio/video collections may belong to different people. Thus, the invention may include the ability to create a combined musical preference profile that provides a best fit for the varied musical tastes of the individuals who make up a group of people.

A further novel feature of the invention may be that feedback about specific content (likes and dislikes) may be integrated into the user's musical preference profile. For example, the user may rate music he hears on the entertainment system, and these ratings may be used to generalize about what types of music the user prefers. It is also possible that a permanent record is kept of each of the ratings provided by the user, and what song each of the ratings corresponds to. The user may provide the rating through spoken words or by actuating pushbuttons, for example.

Figure 2:
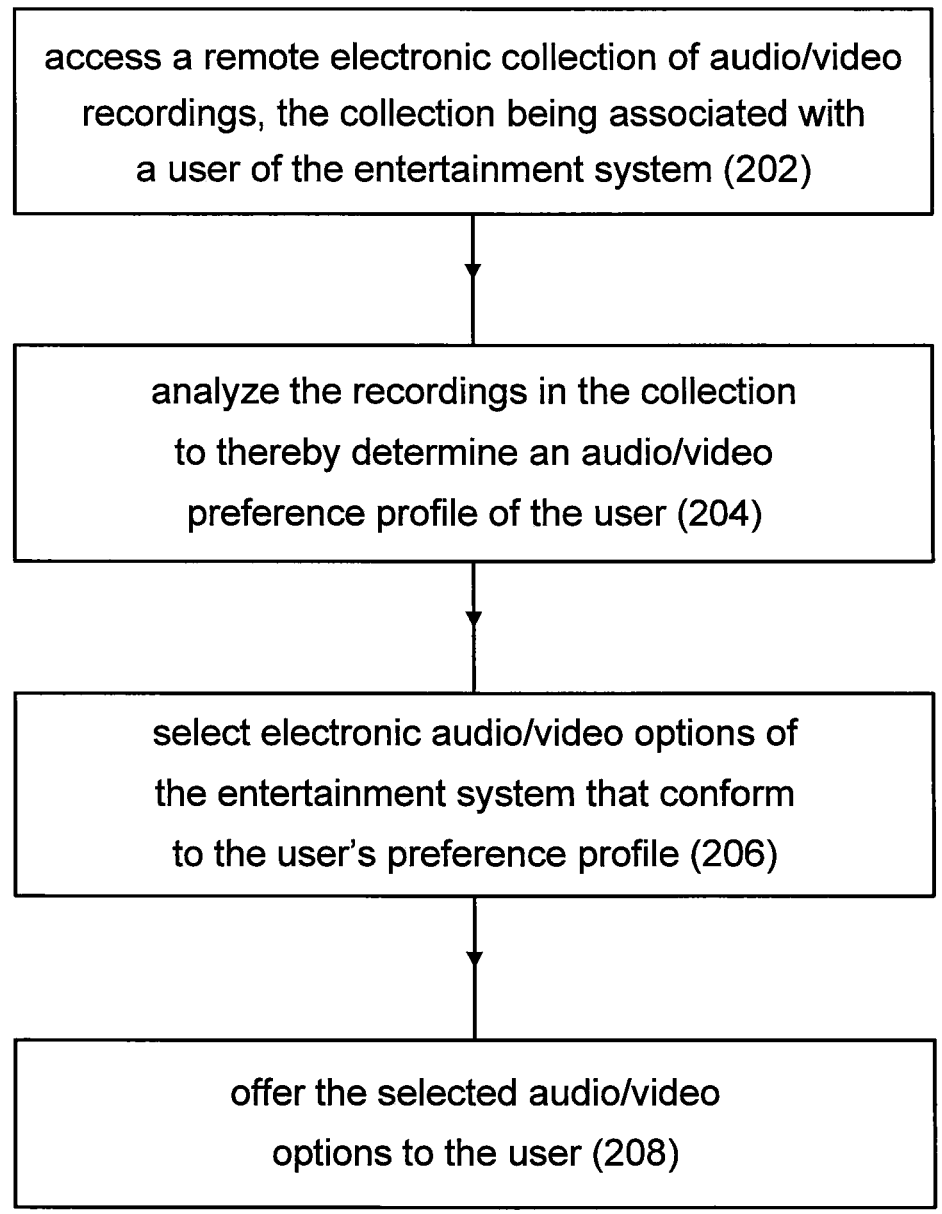
FIG. 2 is a flow chart of one embodiment of a method of the present invention for operating an entertainment system.

Referring now to the drawings and particularly to FIG. 2, there is shown one embodiment of a method 200 of the present invention for operating an entertainment system. In a first step 202, a remote electronic collection of audio/video recordings is accessed, the collection being associated with a user of the entertainment system. For example, a vehicle audio system may be communicatively coupled (wired or wirelessly) to a passenger's iPod or other personal music player that the user carries into the passenger compartment of the vehicle with him. The audio system may be able to retrieve the music content on the player and/or identifications of the music on the player.

In a second step 204, the recordings in the collection are analyzed to thereby determine an audio/video preference profile of the user. That is, the songs in the collection may be analyzed by any of various methods, including sampling and quantitative analysis, to determine type(s) or genre(s) of music that is/are primarily represented in the collection. Alternatively, or in addition, the artist or artists who is/are primarily represented in the collection may be determined. The type(s) or genre(s) of music that is/are typically produced by the artist(s) may be ascertained, such as by use of a lookup table, for example.

Next, in step 206, electronic audio/video options of the entertainment system that conform to the user's preference profile are selected. For example, radio stations that are within receiving range of the system's radio and that broadcast music of the same type as found in the remote collection may be selected. This may involve sampling and analyzing the music played on each station, or reading such identifying information that may be carried on the station's signal. As another example, various pieces of music that are stored within the entertainment system and that are ascertained to be of the same type/genre or artist as found in the remote collection may be selected.

In a final step 208, the selected audio/video options may be offered to the user. For example, in the case of a selected radio station, the system may automatically tune to the station, may program a preset pushbutton of the radio to the frequency of the station, or may give the user the option of allowing the system to do either of the above. In the case of a selected piece of music, the system may automatically play the musical piece or may give the user the option of allowing the system to play the musical piece.

Figure 3:
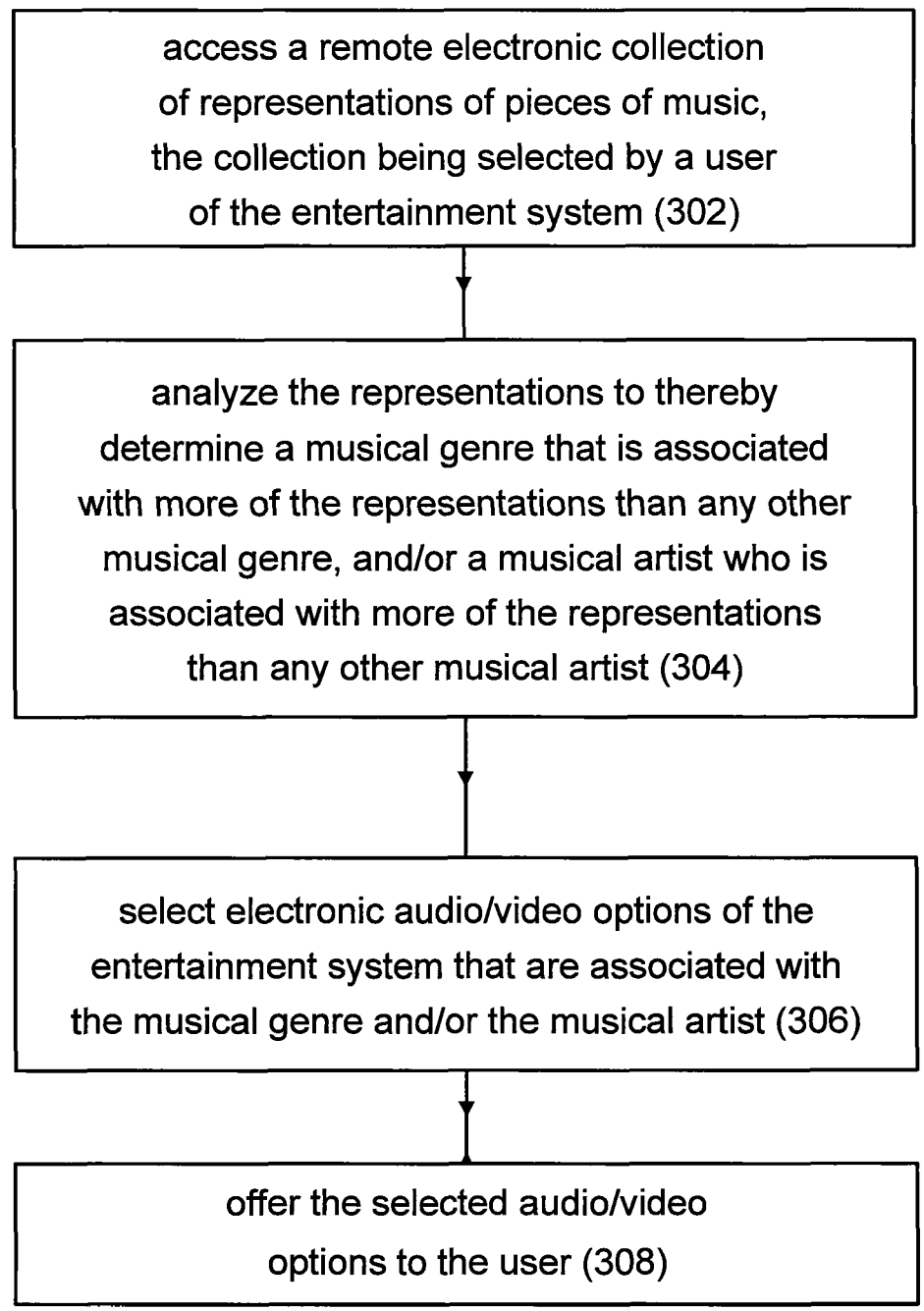
FIG. 3 is a flow chart of another embodiment of a method of the present invention for operating an entertainment system.

Another embodiment of a method 300 of the present invention for operating an entertainment system is illustrated in FIG. 3. In a first step 302, a remote (e.g., external to the entertainment system) electronic collection of representations of pieces of music is accessed, the collection being selected by a user of the entertainment system. For example, a vehicle audio system may be communicatively coupled (wired or wirelessly) to a passenger's iPod or other personal music player that the user carries into the passenger compartment of the vehicle with him. The audio system may be able to retrieve representations of pieces of music on the player, such as digital reproductions of musical content and/or identifications of the music and/or artist who produced the music. The contents of the player may have been downloaded onto the player by the user or otherwise chosen by the user. The vehicle may be in the form of an automobile or more public transportation such as an airplane, bus, train or ship.

In a second step 304, the representations are analyzed to thereby determine a musical genre that is associated with more of the representations than any other musical genre, and/or a musical artist who is associated with more of the representations than any other musical artist. For example, it may be determined that the musical genre of jazz is the most prevalent or frequently occurring genre in the user's music which is stored on his personal player. Alternatively, or in addition, it may be determined that the jazz musician Kenny G has performed more pieces of music in the collection than any other artist.

Next, in step 306, electronic audio/video options of the entertainment system that are associated with the musical genre and/or musical artist are selected. Continuing the example above, radio stations that are within receiving range of the system's radio and that broadcast jazz music may be selected. This may involve sampling and analyzing the music played on each station, or reading such identifying information that may be carried on the station's signal. As another example, various pieces of music that are stored within the entertainment system and that are ascertained to be of the jazz type may be selected.

In a final step 308, the selected audio/video options are offered to the user. For example, in the case of a selected radio station, the system may automatically tune to the station, may program a preset pushbutton of the radio to the frequency of the station, or may give the user the option of allowing the system to do either of the above. In the case of a selected piece of music, the system may automatically play the musical piece or may give the user the option of allowing the system to play the musical piece.

Figure 4:
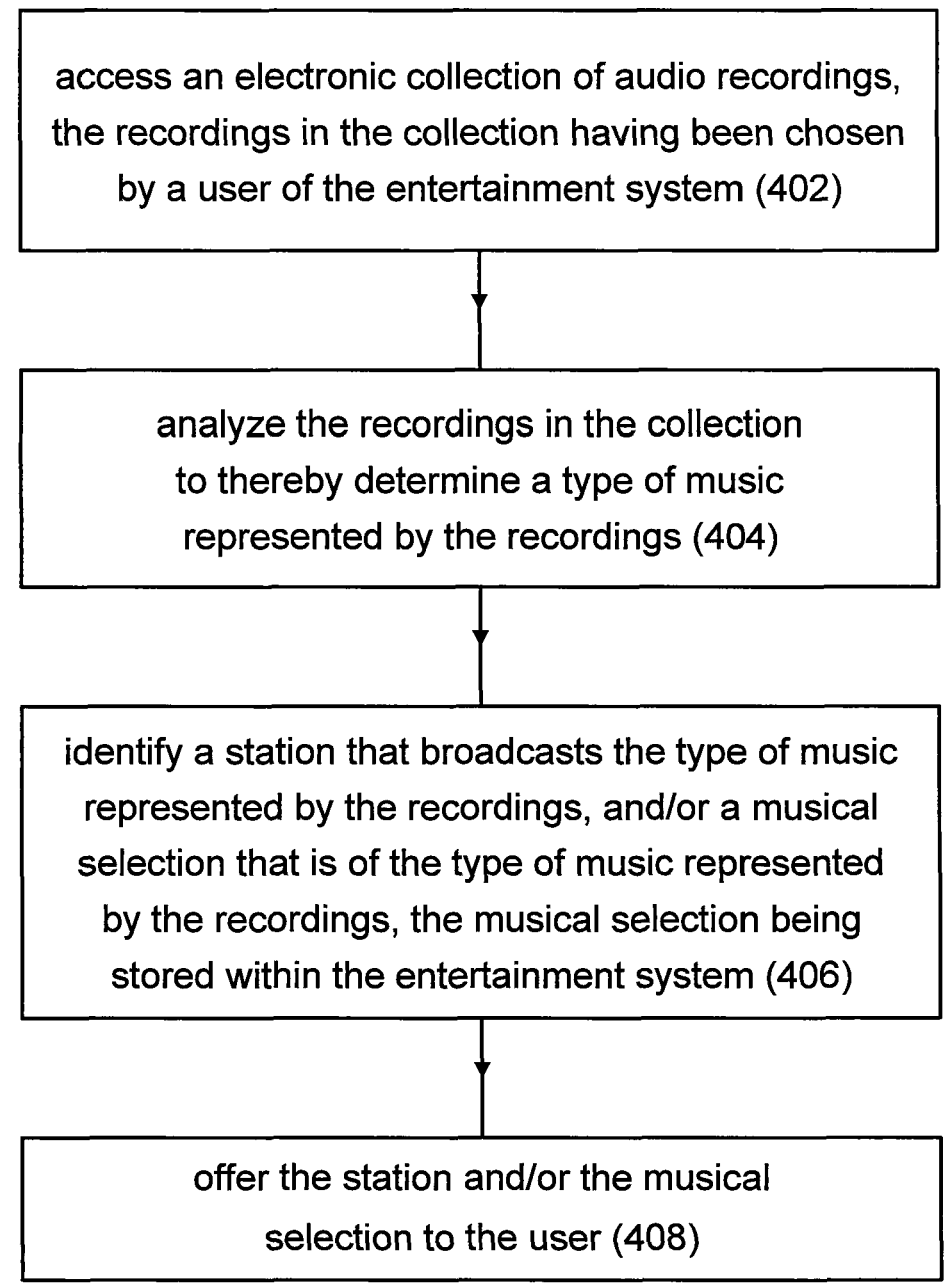
FIG. 4 is a flow chart of yet another embodiment of a method of the present invention for operating an entertainment system.

Yet another embodiment of a method 400 of the present invention for operating an entertainment system is illustrated in FIG. 4. In a first step 402, an electronic collection of audio recordings is accessed, the recordings in the collection having been chosen by a user of the entertainment system. For example, a vehicle audio system may be communicatively coupled (wired or wirelessly) to a passenger's iPod or other personal music player that the user carries into the passenger compartment of the vehicle with him. In one embodiment, a memory stick, memory card or other memory device containing user-selected musical recordings is plugged into a USB port of the audio system. The audio system may be able to retrieve musical recordings on the player/memory device, such as digital reproductions of musical content. The recordings in the player/memory device may have been downloaded/stored onto the player/memory device by the user or otherwise chosen by the user.

In a second step 404, the recordings in the collection are analyzed to thereby determine a type of music represented by the recordings. That is, the recordings in the collection may be analyzed by any of various methods, including sampling and quantitative analyses such as recurrence quantification analysis, to determine type(s) or genre(s) of music that is/are primarily represented in the collection.

Next, in step 406, a station that broadcasts the type of music represented by the recordings, and/or a musical selection that is of the type of music represented by the recordings is identified. The musical selection is stored within the entertainment system. For example, radio stations that are within receiving range of the system's radio and that broadcast music of the same type as the recordings may be identified. This may involve sampling and analyzing the music played on each station, or reading such identifying information that may be carried on the station's signal to determine what type of music the station primarily broadcasts. As another example, various pieces of music that are stored within the entertainment system and that are ascertained to be of the same type as the recordings may be identified.

In a final step 408, the station and/or musical selection is offered to the user. For example, in the case of an identified radio station, the system may automatically tune to the station, may program a preset pushbutton of the radio to the frequency of the station, or may give the user the option of allowing the system to do either of the above. In the case of an identified piece of music, the system may automatically play the musical piece or may give the user the option of allowing the system to play the musical piece.

Various methods may be employed within the scope of the invention for identifying, classifying, and/or quantifying the types of music that describe and/or define a user's musical taste. Radio signals in the Radio Data System (RDS) standard (Europe) or in the Radio Broadcast Data System (RBDS) standard (U.S.) may specify the type of music that the station broadcasts, such as classical, pop, jazz, etc. Music collections analyzed by the system of the invention may include similar descriptions of the classification(s) of music contained in the collections. It is also possible to classify music by artist or by groups of artists. For example, if a collection includes a piece by a certain artist, it may be deemed likely that the user would also enjoy other pieces by that artist. Moreover, an artist may be identified as producing pieces of a particular musical genre. For example, music produced by symphony orchestras may be assumed to be classical. Thus, a user whose taste includes primarily classical music may be assumed to also enjoy music by other classical artists, such as music by other symphony orchestras. It is also possible for the system to analyze the music itself in order to classify the music. For example, recurrence quantification analysis may be applied to the music in order to identify its musical genre.

The invention has been described herein as pertaining primarily to identifying audio preferences of listeners and tailoring audio offerings to those preferences. However, the present invention may be equally applicable to identifying video preferences of listeners and tailoring video offerings to those preferences.

The invention has been described herein as pertaining primarily to identifying musical preferences of listeners and tailoring musical offerings to those preferences. However, the present invention may be equally applicable to identifying other types of listeners' preferred audio genres (e.g., audiobooks) and audio artists (e.g., literary authors such as Ken Follett).

While this invention has been described as having an exemplary design, the present invention may be further modified within the spirit and scope of this disclosure. This application is therefore intended to cover any variations, uses, or adaptations of the invention using its general principles.

What is claimed is:

1. A method of operating an entertainment system, said method comprising the computer-implemented steps of:
   accessing a user's external collection of recordings of music, the recordings in the collection having been chosen by a user of the entertainment system;
   analyzing the recordings in the collection to thereby determine a type of music represented by the recordings;
   identifying a station that broadcasts the type of music represented by the recordings; and
   offering to the user to program a preset pushbutton of a radio of the entertainment system to the station.

2. The method of claim 1 wherein each of the steps is performed by an electronic processor of the entertainment system.

3. The method of claim 1 wherein the analyzing step includes analyzing textual information recorded in association with the music.

4. The method of claim 1 wherein the station is on one of satellite radio, digital broadcast radio, and the internet.

5. The method of claim 1 wherein the offering step includes performing automatic tuning of a radio.

6. The method of claim 1 wherein the external collection of recordings of music is stored on a personal music player.

7. A method of operating an entertainment system, said method comprising the computer-implemented steps of:
   accessing a remote electronic collection of audio/video recordings stored on a personal music player, the collection being associated with a user of the entertainment system;
   analyzing the recordings in the collection to thereby determine an audio/video preference profile of the user;
   selecting electronic audio/video options of the entertainment system that conform to the user's preference profile;
   offering the selected audio/video options to the user; and
   recording aggregate lengths of time the user spends listening to each of a plurality of radio stations, the determination of the audio/video preference profile of the user being dependent upon the aggregate lengths of time and the respective genres of the radio stations.

8. The method of claim 7 wherein the audio/video recordings include digital reproductions of the pieces of music.

9. The method of claim 7 wherein the user has previously chosen the recordings in the collection.

10. The method of claim 7 wherein each of the steps is performed by an electronic processor of the entertainment system.

11. The method of claim 7 wherein the preference profile includes at least one favorite genre and or a favorite artist of the user.

12. The method of claim 7 wherein the selected audio/visual options include at least one song stored within the entertainment system.

13. A method of operating an entertainment system, said method comprising the computer-implemented steps of:

accessing a remote electronic collection of audio/video recordings stored on a personal music player, the collection being associated with a user of the entertainment system;

analyzing the recordings in the collection to thereby determine an audio/video preference profile of the user;

selecting electronic audio/video options of the entertainment system that conform to the user's preference profile;

offering the selected audio/video options to the user; and recording loudness volumes at which the user listens to each of a plurality of radio stations, the determination of the audio/video preference profile of the user being dependent upon the loudness volumes and the respective genres of the radio stations.

14. The method of claim 13 wherein the user has previously chosen the recordings in the collection.

15. The method of claim 13 wherein each of the steps is performed by an electronic processor of the entertainment system.

16. The method of claim 13 wherein the preference profile includes at least one favorite genre and/or a favorite artist of the user.

17. The method of claim 13 wherein the selected audio/visual options include at least one song stored within the entertainment system.

18. The method of claim 13 wherein the audio/video recordings include digital reproductions of the pieces of music.

* * * * *